Dec. 3, 1940.    G. E. POWELL    2,223,855
LAND AND WATER VEHICLE
Filed July 10, 1937    5 Sheets-Sheet 1

INVENTOR.
George E. Powell
BY
*Earl E Moore*
ATTORNEY.

Dec. 3, 1940. G. E. POWELL 2,223,855
LAND AND WATER VEHICLE
Filed July 10, 1937 5 Sheets-Sheet 4

INVENTOR.
George E. Powell
BY
Earl E. Moore
ATTORNEY.

Dec. 3, 1940.    G. E. POWELL    2,223,855
LAND AND WATER VEHICLE
Filed July 10, 1937    5 Sheets-Sheet 5

INVENTOR.
George E. Powell
BY Earl E. Moore
ATTORNEY.

Patented Dec. 3, 1940

2,223,855

UNITED STATES PATENT OFFICE 2,223,855

LAND AND WATER VEHICLE

George E. Powell, Glendale, Calif.

Application July 10, 1937, Serial No. 152,960

6 Claims. (Cl. 115—1)

This invention relates to land and/or water vehicles designed to carry freight, passengers, armaments, tools, life saving equipment, derricks, or for towing purposes and be self-propelled upon land and/or water, the same propelling means being employed in the water and on the land. The operator of the vehicle need not at any time leave his seat at the controls while the vehicle is being driven from the land into the water or from the water onto the land. Such an amphibian device equipped with an endless non-skid traction tread, commonly known as a track layer or caterpillar, surmounts most any obstacle for a successful launching as well as for making a highway after emerging from the water.

A plurality of wheels are employed on both sides of the vehicle, preferably four on a side; the axis of all wheels, however, are not on a common horizontal plane. It has been found more practical, to mount the spindles which carry the end pairs of wheels upon an elevated horizontal plane appreciably above the plane in which the other spindles are mounted so that the endless traction tread is somewhat crescent shaped. Such a feature, permits easy turning of the vehicle when being operated upon substantially flat ground. The center of gravity has purposely been kept low and at the center of the vehicle so as to keep it on an even keel when afloat and to minimize undue strains upon the structural members when operated upon rough and uneven ground. Power can be applied to either or both endless traction treads. By operating one or the other, turns can be made in a small compass over very rough ground.

In the navigation of sea-craft, it sometimes becomes imperative to operate the craft astern at variable high speeds. Applicant has designed a mechanism capable of quickly reversing the direction of the craft's travel without reversing operation of the power plant or the variable speed mechanism. The reversal device is designed to be mounted between the drive shaft and the propulsion means and operable entirely independent of the power plant.

The means for propelling the vehicle upon the land is also utilized for propelling it through water. Bowed or angled treadshoes are provided upon the tread surface of the endless belt or track layer device, enabling firm gripping of sandy or marshy ground, and for effective scooping and displacement of water when the amphibian device is afloat for propelling it through the water. Such an assembly makes launching and landing of the vehicle safe and certain with a minimum loss of time. Since the same means of mechanism is employed for propulsion upon land or sea, a single set of controls are provided which results in simplicity of operation and thus, greater ease in launching and landing.

Upon the land, the bowed or angled tread shoes no longer act as paddles, but as ground grippers to assure travel of the amphibian vehicle to and from the water. Resilient material, preferably rubber, reinforced with cords, is used in the construction of the shoes to give them strength and durability. This construction gives the shoes stability and firmness and at the same time sufficient resiliency and cushion effect to hold well to smooth surfaces which may be wet, thus preventing slipping and skidding. Such a feature is of especial advantage where there are no harbors and the vehicle must use the natural shore line for entering and leaving the water. Sand bars, whether submerged or not, are not impediments to the progress of such an amphibian device and for this reason, it can be used successfully in saving life near the shore.

An object of this invention is the provision of a vehicle designed for land and/or water travel with a single set of controls for its successful launching and landing.

Another object is the development of means and methods whereby such an amphibian vehicle can be operated at variable high speeds in all directions upon land and sea.

Another object is the operation and control of such a vehicle by the same mechanism and method upon land and water.

Another object is the production of a land and/or water craft that is seaworthy when afloat and capable of rough handling and usage when driven upon the land.

Another object is an amphibian vehicle strongly braced and strutted for land and/or water travel and also, of effective design and configuration to offer the minimum of resistance to wind and water.

Another object is the utilization of the same water and land motive means for propelling the vehicle in, or out of the water.

Another object is the utilization of resilient endless traction means which do not require lubrication.

Another object is the construction of an amphibian vehicle having hollow buoyant means for propelling and alining the endless traction treadway for increasing the buoyancy of the vehicle.

Another object is to provide means for lubricating the track layer wheel bearings and prevent entrance of water or sand to the bearings.

Another object is to seal all joint and mechanism openings water tight.

Still another object is the provision of means to prevent damage to mechanism used in the water while the vehicle is operated upon the land.

Still further objects will become apparent from reading the specification and perusing the drawings.

The following description is for one form of the invention and the illustrations and description of this form is not to be taken as limiting the scope of the invention except as limited by the appended claims. Applicant is well aware of the various changes that may be made in the invention beyond the specific form illustrated and described.

Figure 1:
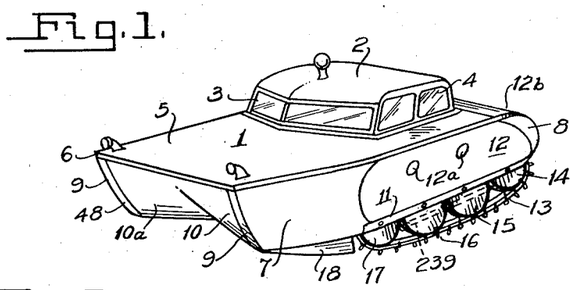
Figure 1 shows a perspective view of an amphibian vehicle.

The numeral 1 represents an amphibian vehicle having an enclosure or cab 2 wherein the driver of the vehicle may be seated near a set of controls for manipulating the amphibian device. The cab and the vehicle may be of any size suitable for the purposes intended. The cab may have a V-type windshield and side windows as indicated by 3 and 4 respectively. At the rear of the cab a door may be provided. An open deck 5 surrounds the cab and provides sufficient space for desired equipment for the successful operation and maneuvering of the vehicle on land or water. Obviously, this deck space may also be used by the passengers in their enjoyment of the craft. If necessary or desirable, part of the deck at the rear may be cut away to provide more room.

Figure 5:
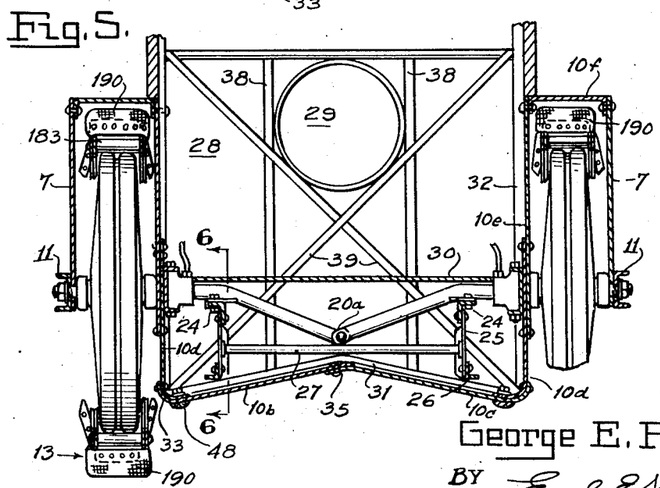
Figure 5 is a transverse view of the vehicle substantially along the line 5—5 of Figure 2, parts being shown in section.

The deck 5 is given the proper camber and configuration to blend to the shape of the hull for streamline effect. The rear of the deck is dipped downwardly to facilitate boarding and alighting to and from the craft whether afloat or not. A bumper strip 6 borders the deck, this strip is fixed to the deck and sides 7 of the vehicle and is of sufficient thickness and toughness to protect the sides of the vehicle, especially when afloat. The rear ends of the sides 7 are somewhat semi-elliptical, as shown, to provide at the lower edge, in cooperation with the bottom plate of the craft, a bow-like stern to aid astern running of the craft. The top edge of 8 follows the configuration of the dipped or rounded deck and gives the stern an attractive appearance. The forward end of the plates 7 bend toward the center line of the craft and are also cambered keelward to form double bows 9. Between the bows are plates 10 and 10a which rise deckward and join at the craft's center line to form a flattened inverted V-like bow element. This V-like form is continued to the stern by bottom plates 10b and 10c as shown in Figure 5. Side plates 10d and 10e join the ends of plates 10b and 10c and extend to the deck. Horizontal plates 10f join plates 10e and 7 to complete the hull. All joints and seams are welded, packed or calked to make the hull water-tight. The hull plates are metal of sufficient gauge and strength to withstand the strains and impacts to be expected of an amphibian vehicle. The vertical plates 10d and 10e have large overlapping areas the entire length of the craft in order to provided added strength at the axle mountings and stiffen the entire hull. The axle mountings are further supported by channel irons 11 on both sides of the vehicle extending from the rounded tip of the stern to the first bend of the sliding 7 toward the bow. These channel irons are riveted or welded to the sides of the plates 7 and materially aid in distributing the strains along the vehicle from concentrated points at the axle ends. These channels also act as collision rails and prevent damage to the craft's sides. To gain access to the spaces or tunnels between the plates 7 and hull plates 10e, a removable section 12 is provided along both sides of the vehicle having vent holes 12a which are above water when the craft is afloat. These vents serve to prevent water being trapped in the said spaces and thus retarding the effectiveness of the motive means, to be later described. The removable plates 12 may be attached to the sides 7 by any suitable means such as bolts and nuts.

An endless tread means, tracklayer or the like 13 is provided upon both sides of the vehicle and is propelled by the rear pair of wheels 14. Wheel pairs 15, 16 and 17 are merely idlers to support the endless tread and have sufficient spacing to give it ample tread surface. The wheels are mounted and alined so as to form roller sets and to shape the endless tread into a crescent-like loop for ease in turning the vehicle. This crescent loop is formed by mounting the end pairs of wheels (pairs 14 and 17 in this particular form of the invention) upon a higher plane than the other wheels (pairs 15 and 16). By this arrangement, a comparatively small friction area exists upon relatively flat ground surfaces and thus aids steering of the vehicle because of the cradle-like effect produced. Where only three wheels are installed upon a side making six wheels in all or three pairs, the front two pairs (idlers) have their axis upon a lower plane than the rear pair of wheels which are the sprocket-like driving wheels; this feature, of course, making in effect a short wheel base which makes steering easy. Forward of the wheel assemblies, on both sides of the vehicle, are hollow streamlined appendages 18 to turn water aside from the treadway in order to reduce water resistance. These appendages also increase the buoyancy of the craft. Cross partitions 19 between the outer plates 7 and inner plates 10e form buoyant compartments 12b and 12c forward and aft, respectively of the craft and materially aid its buoyancy.

Figure 2:
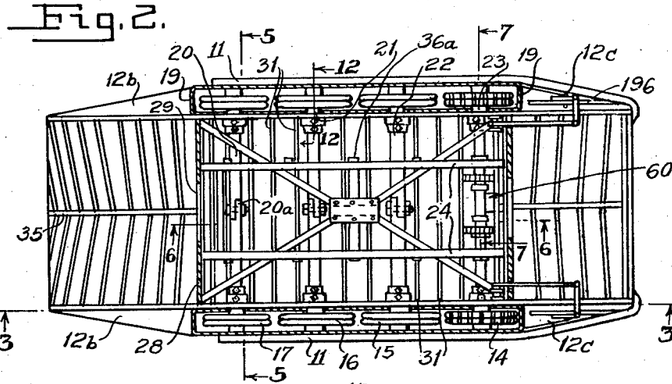
Figure 2 is a plan view of the lower frame construction and under carriage mechanism taken substantially along the line 2—2 of Figure 3 in the direction of the arrows, parts being shown in section.
Figures 3, 4:
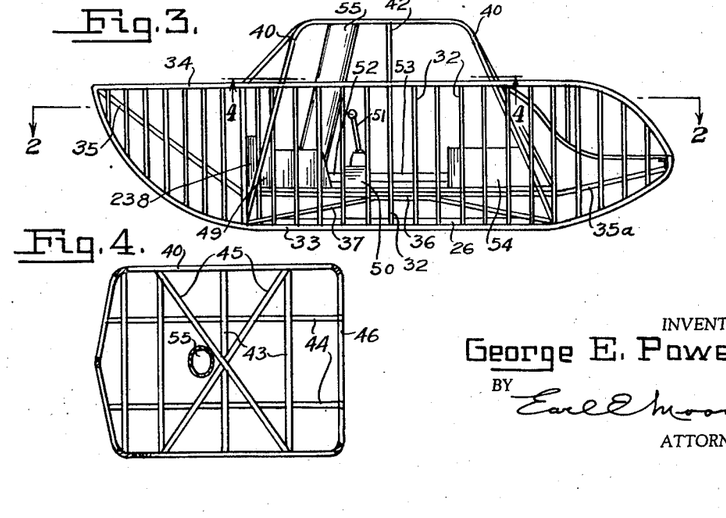
Figure 3 is an elevation of the frame construction taken substantially on the line 3—3 of Figure 2, parts being shown in section.
Figure 4 is a view of the cab frame taken substantially on the line 4—4 of Figure 3, parts being shown in section.

As shown in Figures 2 and 5, the idler wheel axles 20, 21 and 22 are not extended as a single piece across the vehicle because of their bent shape; they are joined together along the center line of the vehicle by bolts or other means as shown at 20a. Because of the bend in each axle, a single piece could not be used. The purpose of the bent axle is to permit an underslung floor (not shown), should more head room be required. The shaft assembly 23, however, is shown without bends for it is this shaft which transmits power to the rear wheels 14.

A rectangular box-like frame of angle iron or other suitable strong material is mounted in the hull of the craft and supports much of the machinery load which is shifted to the axles. This frame includes upper keelsons or stringers 24 which are strapped to the axles 20, 21, 22 and 23 very securely in any convenient manner. A lower set of keelsons or stringers 26 are rigidly held in place by a plurality of vertical angle irons 25 spaced along the entire length of the keelsons. Cross stiffeners 27, of pipe or solid rod, are provided at suitable places fixed to the angle irons 25, and also to the axle joints 20a etc. For very large vehicles the box-like framing would be divided to form a plurality of box-like frames so as to be more effective as a stiffener. The ends of the frame structure are fixed to the cross bulkheads 28 which divide the interior of the hull into a main central chamber and end chambers forward and aft. Manholes 29 provide means for gaining access to the various chambers. The manholes are relatively high so as to prevent flooding of all chambers in case water should enter one of them. A floor plate 30 is provided in the central chamber. This floor is shown above the axles, but may be mounted at any desirable elevation below. The axles are bent downwardly purposely to accommodate an underslung floor, the main walking space being clear of any obstruction.

Bottom angle irons 31, bent or joined to provide a frame for the bottom plates 10b and 10c; are fixed, as by welding or other means, to vertical angle irons 32. The bottom plates, angles 31 and 26 are all welded together to present a strong well braced bottom for the vehicle. The vertical angle irons 32 are riveted to the side plates 10d and 10e and materially aid in stiffening the vehicle. The reinforced edges 33 formed by the union of plates 10b and 10d and also by plates 10c and 10d provide strengtheners or stringers extending from bow to stern; a similar stringer 34 is formed by the union of the side plates 10e with the deck plate 5. The jointure of box plates 10 and 10a and under plates 10b and 10c form a keel-like stringer 35 which extends along the center line of the craft from bow to stern. The under plates of the hull may be curved so as to form a concaved under body groove instead of the flattened inverted V-shape groove. This construction not only serves to provide clearance for objects upon the ground but also aids in making the hull seaworthy by resulting in greater stability of the craft similar to two boats lying parallel. This feature prevents rolling in a turbulent sea and thus holds the endless treads in the water at all times.

To further brace the craft to withstand the shocks and impacts to be expected in its normal use, a sub-structure frame beneath the floor 30 is provided. A heavy plate 36 is welded, bolted or otherwise fixed to a heavy cross plate 36a which is fixed to the top keelsons 24. From the diagonal corners of this plate angle irons 37 extend downwardly and outwardly to the frame corners 37a where they are welded or otherwise fixed to the stringers 33 and bulkheads 28. The bulkheads 28 are vertically and diagonally strengthened by angle irons 38 and 39, respectively, which are welded to the bulkhead plate. Fixed to the bulkheads 28 and stringers 33 are angle irons 40, one from each corner, which rise to support the cab roof 2 formed from a sheet metal plate 41. Angle irons and plate being curved where desirable to form a neat appearance and blend in with the streamlining effect of the vehicle. A pair of angle irons 40a between the rear iron 40 also aid in stiffening the cab. These angle irons are fixed, by welding, to the keelsons 24. The roof is braced by angle irons 43 and 44 running at right angles to one another and also by diagonal angle irons 45. Openings are provided for the windshield 3, windows 4 and a doorway 46. Side vertical angle irons 42 help to support the roof. Wood strips 47 are placed within the flanges of the angle irons to provide a means to hold nails for decorative purposes.

Figures 12, 13, 13A, 14, 15, 16:
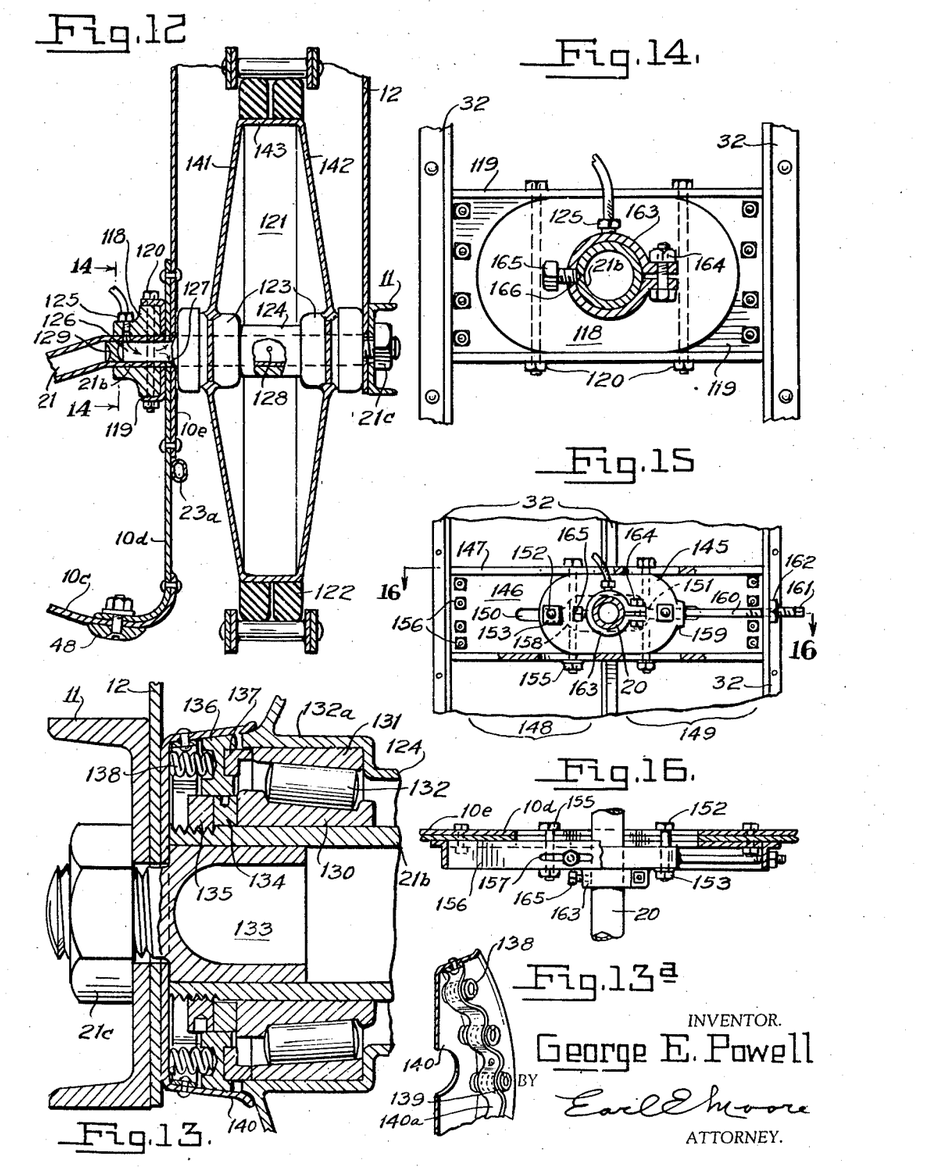
Figure 12 is a section of one of the idler wheels and associated parts taken substantially along the line 12—12 of Figure 2.
Figure 13 is a bearing detail in section of one of the idler wheels.
Figure 13a shows in perspective a portion of the hub assembly.
Figure 14 is an elevation, partly in section, substantially along the line 14—14 of Figure 12, showing an idler axle mounting.
Figure 15 is an elevation, partly in section, showing an idler axle mounting with adjustable means within the hull of the vehicle.
Figure 16 is a horizontal view, partly in section, taken substantially along the line 16—16 of Figure 15.

Skid strip 48 of heavy metal is fixed to the bow plates and under plates at each side of the hull as shown to protect the hull bottom from damage when it contacts hard surfaces and also aids in strengthening the entire undercarriage. These strips or skid rails may be of any suitable metal and welded to the lowermost sections of the hull plates, or bolted as shown in Figure 12.

A gas or oil internal combustion engine is shown at 49 anchored to the box frame and also an automotive type gear shift assembly 50 having the lever 51. A torque tube 52 is shown connecting the engine and gear shift and also a torque tube 53 connecting the gear shift assembly with a final drive assembly casing 54 to be presently described. A heat dissipating stack 55 passing through the cab roof is provided to carry away from the cab much of the engine heat. A closure means may be provided at the top of the stack to prevent water splash entering the stack when the vehicle is being launched.

The final drive and associated parts will now be described. The reference character 60 indicates the final drive mechanism within the casing 54. The casing and mechanism depends from the sleeve 61a of the rear axle rod 61 by means of inverted U-straps 62 and casing extension arms 63. A fluted shaft 64 passes through the casing via roller bearings 65; a sleeve 66 fixed with respect to the casing provides a slideway for the cup 66a of the bearing and guides the bearing a limited distance along its axis. A bevel gear carrier 67 at its ends provides the cone for the roller bearings. Two component parts of the carrier are joined by their respective flanges 68 by any suitable means. The carrier is free to turn in the bearing cups 66a and also to slide laterally along the axis of the shaft.

Figures 7, 10:
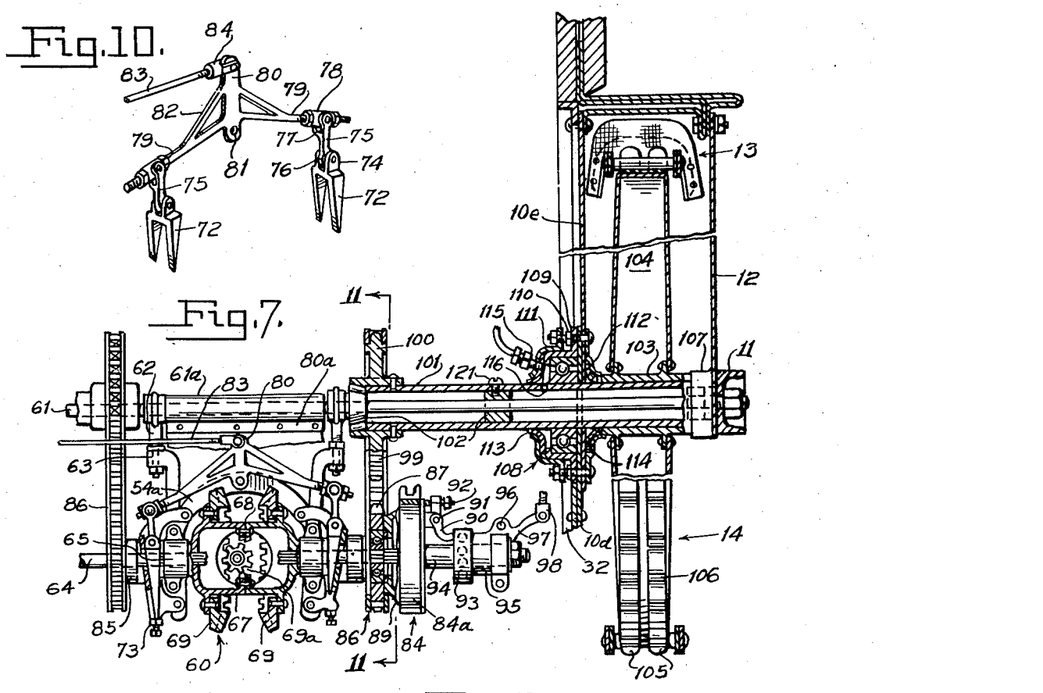
Figure 7 is an elevation of a detail, mostly in section, substantially along the line 7—7 of Figure 2.
Figure 10 is a perspective of the shifting means and wedges shown in Figure 7.

The carrier hub ends which form the cones for the bearings have splined bores which snugly fit the fluted shaft 64, this construction permits the bearings and carrier to be shifted along the axis of the shaft and maintain continuous driving connection. A pair of spaced beveled gears 69 with their respective toothed faces toward one another are fixed to the carrier 67 by any suitable means. A beveled pinion gear 69a attached to the drive shaft of the engine is fixed in a definite position as shown in Figure 7. By shifting the carrier 67 along the axis of the shaft 64, either one of the two beveled gears may be brought into mesh with the beveled pinion gear 69a.

Figures 8, 9:
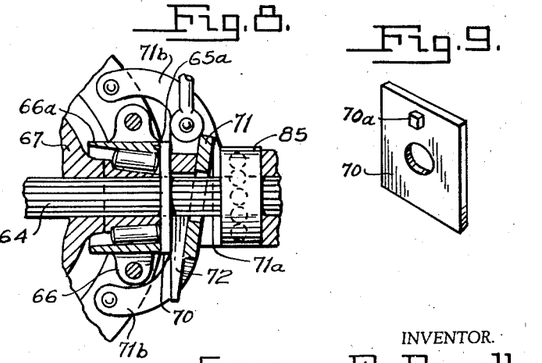
Figure 8 is an elevation of a detail of Figure 7 showing the shifting wedge.
Figure 9 is a perspective of a special washer shown in Figures 7 and 8.

Square washers 70 (Figure 8) mounted upon the shaft 64 have fixed blocks 70a which engage recesses 65a in the outer cheek of the bearing cups 66a to prevent the cups from rotating in the sleeves 66.

Flanged H-like or straddle elements 71, backed by beveled washers 71a, have arms 71b that are fixed to a flange 54a of the casing 54 and form guides for wedge shaped bifurcated elements 72. Two of these elements are employed on opposite sides of the shiftable gear carrier and bearing assembly.

Adjustable stops 73 fixed to the casing 54 limit the downward movement of the elements 72. These elements 72 (Figure 10) have trunnions 74 pivoted to linkages 75, the eye 76 of the linkages being connected to 74 by a pin and the bifurcated end 77 being pivotally connected with a threaded sleeve 78 upon a threaded rod 79. Lock nuts are employed upon the threaded ends of the rods 79 to adjust the position of the sleeves. The rods are fixed to a standard 80 which is pivoted at 81 to the casing flange 54a. Bracing members 82 stiffen the assembly and assure fixed alinement. The top of the standard is pivoted to a bifurcated coupling 84 which is threaded to a rod 83 leading to a lever in the control cabin of the vehicle. By the arrangement just described, the rod 79 can be rocked so as to lower one of the wedge elements 7a and raise the other; this action reciprocating the gear carrier so as to cause alternate engagement of the bevel gears 69 with the pinion gear 69a. Since the pinion gear rotates always in one direction, by reciprocating the gear carrier 67 the shaft 64 can be rotated in either direction.

Figure 11:
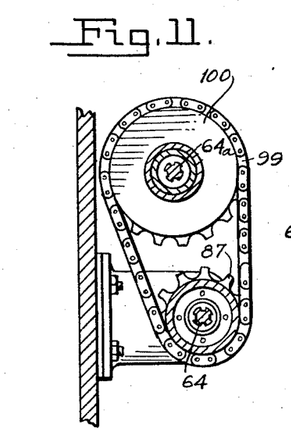
Figure 11 is an elevation, partly in elevation, substantially along the line 11—11 of Figure 7.

Near the ends of the shaft 64 are mounted clutch brake assemblies 84, one at each end; for the sake of simplicity only one is shown in Figure 7. These clutches permit ordinary translated driving or, by varying the clutch plate pressures, the vehicle can be steered. Intermediate these assemblies and the guides 71 are thrust bearings 85 and sprocket wheel assemblies 86. The thrust bearings are of standard and well known types and will not be described. The sprocket wheel assemblies include a sprocket wheel 87 (see Figures 7 and 11) mounted upon a ball bearing so that the sprocket is free to rotate upon the shaft 64. One side cheek of the sprockets 87 is joined by a spider 89 with a side of a free rotary plate of a standard multiple disc clutch of the assemblies 84, the fluted shaft 64 holding the other clutch plate fixed thereto. Means for engaging and releasing the clutch is shown in Figure 7 comprising a rocker arm 90 pivoted at 91 to a fixed immovable element of the vehicle. One end of the arm reciprocates a rod 92 which is fixed to the shiftable plate of the clutch whereas the other end rides against the cheek of a thrust bearing 93 which is loose upon a fixed shaft tube 94. The thrust bearing is shiftable along the tube by the bifurcated end of a crank 95 which is pivoted at 96 to a fixed part of the vehicle. An eyed arm 97 of the crank is pivoted to a rod 98 which runs to the control cab. Operation of the rod obviously reciprocates the shiftable clutch plate so as to variably transmit power from the shaft 64 to the sprocket wheel 87.

The brake band 94a is of common and standard make and has controllable lever means to tighten and release the band upon the outer periphery of the clutch annular movable band so that the movement of the drive axle can be controlled. Suitable rods are provided to control the brake bands from the driver's seat. Since such brake-clutch assemblies are well known, no further description is made.

The sprocket wheel 87 transmits power by a connected chain 99 to a sprocket wheel 100 of larger diameter, this wheel being fixed to a torque tube 101 which is concentric with but spaced from the axle 61 by spacer bearings 102. The torque tube is fixed to the hubs 103 of the drive wheels 104.

The drive wheels 14 are hollow disc type and have a plurality of tires with solid rubber or equivalent material as indicated by 105 and have cross grooves or slots 106 designed to fit bars 183 and 186 of an endless tread device to be later described. It has been found that a plurality of spaced solid rubber tires on such a vehicle as this provides greater resiliency than a single broad tire and also, the spacing of the tires provides a means for the escape of sand and gravel which are carried by the endless tread. Rubber is preferred because when in water, the wet rubber grooves and endless tread bars work very efficiently together as though lubricated. A hub ball or roller bearing 107 fixed to the plate 12 and channel 11 provides an end support for the torque tube. On the opposite side of the wheels the torque tubes 101 are journalled in a ball bearing assembly 108 which are held to the heavy side plates 10d and 10e of the vehicle by clamps 109 having the bolts 110. These bolts also hold grease shields or retainers 111 and 112 in place upon opposite sides of the lapped plates 10d and 10e. The retainers 111 having packing strips 113, and retainers 112 packing strips 114 to prevent loss of lubricant, and also the entry of water or sand into the bearing surfaces. Oil or grease is fed into the bearing areas under a maintained predetermined pressure by means of the connection 115. Holes 116 are provided in the tube 101 so that lubricant can enter the tube to lubricate spacer bearings 102 and hub bearing 107.

The idler wheel assemblies will now be described, this description appertains to the idler wheels 15 and 16, and also to idlers 17 except for the changes necessary to make these wheels adjustable.

The axles 21 have straight portions 21b which are supported by pillow blocks 118 and the channel 11. A threaded end of the axles receive nuts 20c for holding them rigidly in place. The pillow blocks are held fixed to a channel iron 119 which is bolted, riveted or welded to the heavy side plates 10d of the vehicle. Bolts 120 pass through the flanges of the channels and the pillow blocks to hold them all as a single unit. Hollow metallic disc wheels 121 having spaced solid rubber tires 122 are mounted upon the axles. The wheel bearings are preferably spaced roller bearings 123 connected by a spacer tube 124 for maintaining the wheels in balanced alinement with the axles. Grease or oil fittings 125 are connected to the pillow blocks for lubrication of the roller bearings. The lubricant (preferably grease) enters the hollow axle space 126 and passes through holes 127 and by its presence maintains a water tight seal between plate 10e and channel iron 119. This lubricant also passes through hole 128 to lubricate both of the bearings 123. An obstruction 129 is fixed within the hollow axle as shown to conserve the lubricant. Straps 130 having ears 131 are tightly clamped around the axles by bolts 132 and have set screws 133 which enter dents 134 of the axles to prevent the axles from turning or lateral movement.

The bearings 123 are constructed as shown in Figure 13. The cone 130 of the bearings having cup 131 and roller 132, fits intermediate the axle 21b and the cap 132a of the spacer tube 124. To give this end of the axle greater strength, a threaded rod carrier 133 to receive the nut 21c is welded to the axle. The end of the axle 21b is threaded to receive lock washers 134 and 135 for holding the bearing in place and also for carrying a felt packing ring 136. Upon one side of the packing ring is an annular recessed portion for carrying an annular composition packing element 137. Upon the other side a plurality of round coil springs 138 embed themselves into the felt. The coil springs are spaced at regular intervals around the annular felt washer 136. A hub cap 140 protects the bearing and it has a plurality of recesses to receive the coil spring ends. To hold these coil springs in place, an annular fluted band spring 140a is provided, the coil spring being held in place and alinement by the band spring. The purpose of this arrangement is to keep the annular composition packing 137 in contact with the cheek of the roller bearing cup 131 and further, due to the allowable side play of the coil springs, to permit the assembly to be elastic.

Oil or grease for the bearings flows within the axle 20b from the fitting 125 to the holes 128 and thence to the roller bearings via of the passage between the axle and tube 124.

All the wheels are constructed alike and may have opposed metallic discs 141 and 142, fixed at the hub to bearing shields or tubes 124 (Figure 12) and at their top to metallic annular elements 143, all of which are welded together to form hollow buoyant wheels.

The end pair of idler wheels 17 are adjustable lengthwise of the vehicle by the construction shown in Figures 15, 16, 17 and 18. Figures 15 and 16 show the adjustable means at the pillow blocks within the hull and Figures 17 and 18 the external means in the channel 11. These wheels 17 must be movable to adjust the tightness of the endless tread 13 and also to permit the ready mounting and removal of the endless tread.

A pillow block 145, similar to 118 of Figure 14, is snugly fitted in the web 146 of a channel iron 147 which extends across the bays 148 and 149 and is securely welded to the vertical angle irons 32. Relatively long slots 150 and 151 are cut in the side plates of the vehicle to accommodate bolts 152 having the nuts 153. The pillow blocks are bored vertically, as shown, to receive bolts 154 having nuts 155. The flanges 156 of the channel iron have slots 157 to receive the bolts 154. The side plates also have a slot 158 to permit the axle 17 to slide therein when loosened. The pillow block 145 has a boss 159 with which an end of a threaded rod 160 operates, the other end of the rod having a squared end to receive a wrench. The rod passes through a hole in a flange of the angle iron 32 and also a threaded bore of a bushing 162 which is welded to the angle iron flange. By loosening the nuts 152 and 155, the pillow block and axle can be moved toward the bow by screwing clockwise the rod 160 to take up play in the endless tread. A clamp 163 is held tight to the axle by bolt and nut 164. A set screw 165 passes through the clamp and seats in a dent 166.

Figures 17, 18, 23, 24:
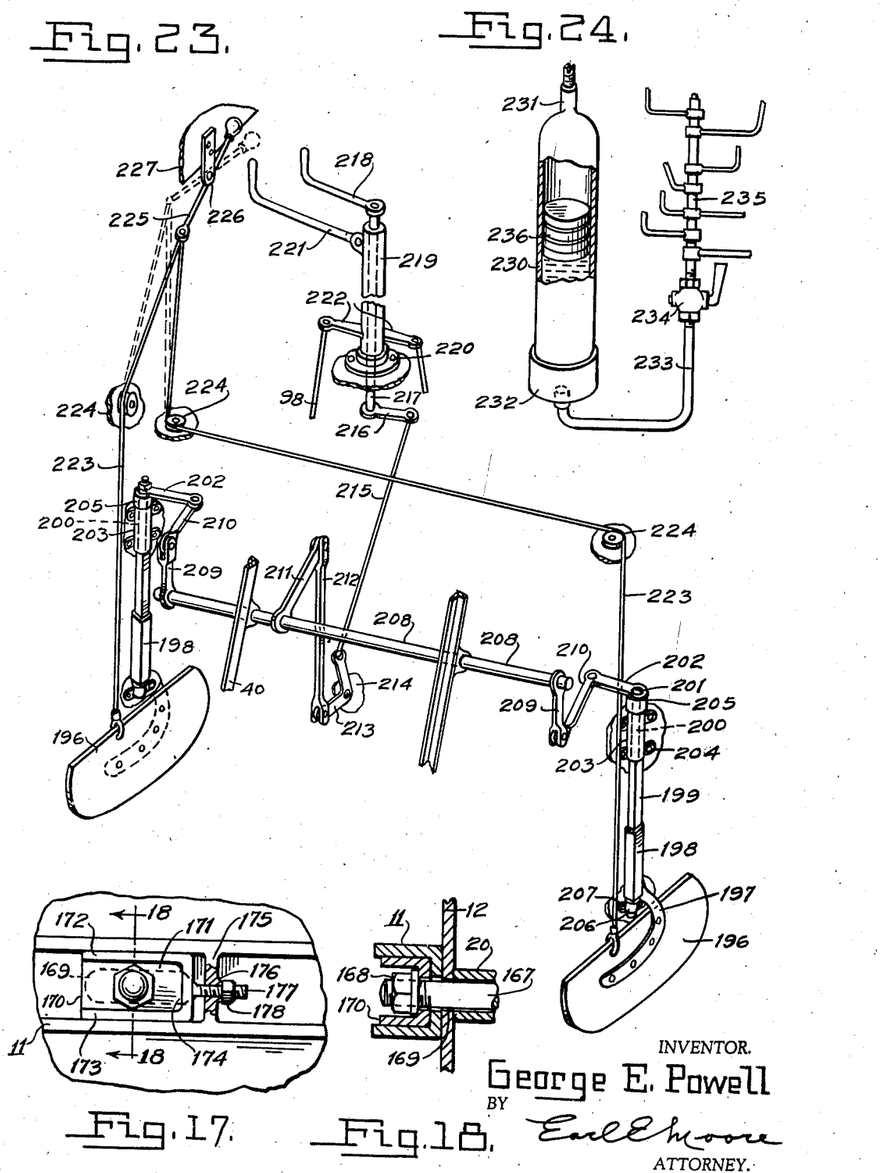
Figure 17 is a vertical view, partly in section, showing means outside of the vehicle for making axle adjustments.
Figure 18 is a sectional vertical view taken substantially along the line 18—18 of Figure 17.
Figure 23 shows a perspective view of the rudders and their control.
Figure 24 shows an elevation of the forced lubrication means, parts being broken away for clarity.

To tighten the endless tread, the device shown in Figures 17 and 18 is used. The axle 20 is telescoped by a threaded rod 167 which is welded to the axle and is provided with a nut 168. The channel iron 11 as well as plate 12 has a slot 169 to fit the rod 167. A channel-like element 170 having a web 171 to receive the rod, has top and bottom flanges 172, 173 and a cross flange 174. This element snugly fits the channel 11 and is free to slide therein. The channel 11 is provided with a cross plate 175 welded to the channel 11 and has a threaded boss portion 176 to receive a screw 177. The screw is positioned to push the element 170 and be locked in position by a lock nut 178. By this arrangement, the endless tread 13 can be tightened by backing the nut 178 and screwing clockwise upon the screw 177.

Figures 19 to 22 inclusive show details of the endless tread 13. The endless tread is made up of a series of connected links 180 and 181; the links having holes 182 near their ends so that they can be lapped and the holes alined to receive a rubber sleeve and pivot pin to be presently described.

Hollow bars 183 having their bores in alinement with the fluted link holes 182 are welded or otherwise fixed to the inner sides of the links 181. Live rubber sleeves or tubes 184 line the bore of the hollow bars and receive a headed and fluted pin 185. These pins are of sufficient length so that the non-headed end of the pin can be turned over as a rivet and held in place. These pivot joints having the live rubber sleeves are elastic and need no lubrication and because of the rubber, no sand and grit can enter the bearing surfaces. The pin tightly wedges the rubber into intimate contact with the walls of the bore in the hollow bars 183 so that there is little or no friction between rubber and bar. Since the pin is fluted, it can not turn within the rubber sleeve to cause surface friction between it and the rubber. The live rubber itself gives sufficiently to allow the links flexibility in passing around the vehicle wheels, and when flexed by riding over rocks and rough ground. The frictional energy is dissipated in the circumferential stretching and flexing of the internal molecules of the rubber itself, and the heat of friction, therefore, is not concentrated as in the ordinary bearing.

Midway between the ends of the links 180 and 181 are hollow bars 186 also welded to the inner sides of the links. These bars do not have rubber sleeves since they are not used at the pivot ends of the links, but form a relatively smooth track for the wheels to run on.

The thread shoe holders are made of angle iron having straight opposed portions or upstanding arms 188 and a semi-octagon horizontal portion 189 joined together to form a frame for affixing the shoes or paddles 190 thereon; the upstanding arms function as guides to keep the endless tread upon the rubber tires of the wheels. The octagon portion passes beneath the links and the upstanding portions passes vertically along the sides of the links.

Figures 6, 19, 20, 21, 22:
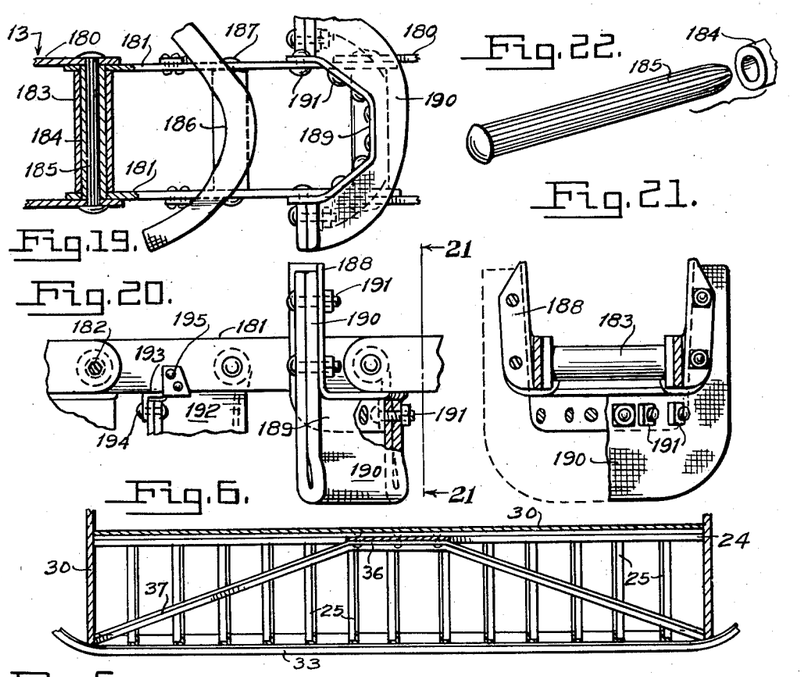
Figure 6 is an elevation of the detailed frame, partly in section, substantially along the line 6—6 of Figure 2.
Figure 19 is a plan view of a short length of the track laying endless tread, parts being in section.
Figure 20 is a side elevation of Figure 19 with parts in section.
Figure 21 is a transverse elevation, partly in section, substantially along the line 21—21 of Figure 20 looking in the direction of the arrows.
Figure 22 shows a perspective view of a pin and sleeve used in the endless tread.

The horizontal and vertical portions are riveted to the links wherever they contact. Leather or other suitable material is used for the shoes 190. When rubber is used, stiffening cords may be embedded in the rubber to give it stability. The material is folded as shown in Figure 20 and cut as shown to fit the angle irons. Sufficient material extends below the angle irons to assure long life and sufficient flexibility and rigidness so that a cushion effect results when the vehicle is passing over a hard surface but good scooping effect when in mud or water. Bolts and nuts 191 are used to hold the shoes to the angle irons. These shoes are positioned along the endless treadway at the bars 183 or at every other bar. The bars 186 have substantially the same shoe, the only difference being that the guides 188 are not used at every bar and, therefore, the shoes do not have vertically extending portions as 190. The shoes 192 are fastened to angle irons 193 having a semi-octagon, semi-circular, angular or any other suitable shape in plan view like 189, bolts and nuts 194 holding them together. Extensions 195 of the angle irons are bent upwardly along the sides of the links 181 and are riveted or bolted thereto.

Figure 23 shows the rubbers and control means therefor. The rudders 196 have the usual configuration and may be metal or other desirable material. The rudders are riveted or bolted to flat arms 197 which have a squared sleeve 198. The sleeve slides vertically along a shaft 199 which has a round section 200 and another squared section at 201 upon which fits the tiller arm or wrench lever 202. A sleeve 203 acts as a bearing for the round part of the shaft 199 and is fastened to the hull of the craft by rivets or other means which pass through the ears 204.

A stuffing box 205 is provided where the shaft pass through the hull. At the other end of the shaft a bearing strap 206 is provided having ears 207 fixed to the hull by rivets or other means. By this construction the rudder may be raised when desired, and when in its lower position, turned by swinging the tiller arm 202.

The rudder assembly just described is provided at each end of the shaft 208. This shaft is connected to the tiller arms by the arms 209 and links 210, one end of each arm being fixed to the shaft and the other end pivoted to the link 210 which has its other end pivoted to the tiller arm 202. By rocking the shaft, the rudders can be turned to steer the craft.

To rock the shaft 208, an end of an arm 211 is fixed thereto, the other end being pivoted to a link 212 which has its opposite end pivoted to a bell crank 213 pivoted to a fixed part of the craft at 214. A connecting rod 215 is pivoted to one end of the crank and also an arm 216 which is fixed to a steering rod 217. At the other end of the rod 217 is a hand lever 218. A sleeve 219 surrounds the rod 217 and is journalled in a flanged socket fixed to the floor of the craft. The upper end of the sleeve has a hand lever 221 rigidly attached thereto and at the floor end an arm 222 fixed to the sleeve, the other end of the arm being pivoted to the rod 98 which connects with the clutch cranks 97. By partially rotating the hand lever 221, the clutches of the final drive can be engaged or released.

To raise the rudders, when the craft is leaving the water, cables 223 which pass over the pulleys 224 and having one of their ends attached to the rudders 196 are provided. A hand lever 225 has fastened thereto the cables 223 at one end thereof and the lever is pivoted as shown at 226 to a bracket 227 fixed to an immovable part of the craft. Any suitable means is used for holding the lever in position to keep the rudders raised.

Figure 24 shows the forced lubrication means including a tank 230 having an air self-closing ingress valve 231 and a cap 232 screwed upon the opposite end. The valve has a male thread for connection to any suitable air pump. The cap 232 is connected with a tube 233 having a hand valve 234. A feed manifold-like pipe 235 connects with the valve 234. A plurality of variously sized tubes connect with the pipe 235, the tubes leading to the various grease fittings throughout the vehicle to supply grease under pressure to all bearings which are more or less exposed to water. The grease is under an air pressure within the tank 230. A hollow free riding piston 236 snugly fits the side walls of the tank, and rides upon the surface of the lubricant 237. An air pressure is maintained above the piston in any suitable manner so that the piston continually urges the grease through the connected ducts to the various bearings. So that the pressure will be equal or nearly so upon all bearings, the tubes leading to the bearings have bores of a size which are in direct inverse ratio with the length of the tubes, that is, the tubes nearest the tank have smaller bores than those further from the tank.

The engine is cooled by a radiator 238 of a type commonly used for automobile vehicles and also by metallic ducts 239 of oval cross-section just outside the hull plate 10d; these ducts hug close to the plates on both sides of the vehicle. Each duct has one end connected with the bottom of the radiator or engine water jacket and pass through the hull near the front idlers and then runs along the hull to a point near the rear wheels where it passes again through the hull and hence to the top of the radiator or the water jacket of the engine. The ducts 239 are situated well below the water line to insure rapid heat dissipation to the sea water and thus cooperate with the radiator to throw off the heat generated in the engine.

Sufficient duct surface may be exposed to the sea water to dispense with the radiator when the craft is afloat, in which case valves may be provided to cut the radiator out of service if desirable. The ducts may be welded to the plates or clamped to the hull sides by straps or any other suitable means.

Having described the invention to enable one skilled in the art to make, use and vend the same, I claim the following:

1. An amphibian vehicle, a hull-chassis substructure, wheel-sets journalled along the lateral sides of the substructure, an endless tread having resilient covered cross-bars encompassing each wheel set, resilient grooved means in each wheel-set for engaging its endless tread and impelling same, spaced apart flanged means on each endless tread to maintain it in encompassing position along its respective wheel-set.

2. In an amphibious vehicle, a hull-like chassis having a plurality of chambers, an endless tread chamber along each side of the chassis having vents in the upper part thereof, said vents having predetermined areas to break vacuum conditions in the chambers when the vehicle is afloat and to prevent appreciable volumes of water being carried with the tread portions not in water.

3. An amphibian device, a body section configurated to form a hull-chassis combination, a prime mover, means connected with the prime mover to propel the device on land and water, the means including flexible non-metallic paddle-like shoes which are curved to form pockets in which to trap water and give stability thereto.

4. A land and water vehicle having spindles and wheels thereon, a hull shaped body having an irregular bottom and including upper and lower wall sections which overlap to form stiffeners along the sides thereof to provide bearing supports for the spindles, a diagonally braced box-like frame within the body having horizontal members for supporting a floor on a level with the overlapping wall stiffeners, cross bottom members of said frame having inverted V-like configuration to give strength and a similar configuration to the bottom of the hull shaped body.

5. In an amphibious vehicle having a bow and stern, a hull-shaped body, an L-shaped wall along each side thereof to form endless tread tunnels, a roller set in each tunnel including a plurality of hollow disc wheels, an endless tread device mounted upon each roller set and having protruding elements to prevent the treads running off their respective roller set, buoyant chambers at the ends of the tunnels, a rudder at the stern end of each tunnel having means to control their alinement and movement in synchronism.

6. The vehicle recited in claim 1 wherein the endless tread includes a plurality of resilient paddle-like shoes which are bent to form a section of a U having its open portion toward the rear of the vehicle.

GEORGE E. POWELL.